United States Patent [19]

Ishimaru et al.

[11] Patent Number: 5,003,399

[45] Date of Patent: Mar. 26, 1991

[54] CAMERA WITH EXCHANGEABLE LENS DEVICE

[75] Inventors: Masayoshi Ishimaru; Koji Iwamoto; Satoshi Miyashita, all of Tokyo, Japan

[73] Assignee: Sony Corporation, Tokyo, Japan

[21] Appl. No.: 434,815

[22] Filed: Nov. 13, 1989

[30] Foreign Application Priority Data

Nov. 17, 1988 [JP] Japan .................................. 63-290810
Nov. 17, 1988 [JP] Japan .................................. 63-290811

[51] Int. Cl.$^5$ ........................ H04N 5/30; G03B 17/00
[52] U.S. Cl. ...................................... 358/209; 354/286
[58] Field of Search ................ 358/209; 354/455, 286

[56] References Cited

U.S. PATENT DOCUMENTS

| | | | |
|---|---|---|---|
| 4,171,529 | 10/1979 | Silberberg et al. | 358/209 |
| 4,509,846 | 4/1985 | Nakai et al. | 354/208 |
| 4,782,355 | 11/1988 | Sakai et al. | 354/455 |
| 4,833,498 | 5/1989 | Kato et al. | 354/286 |
| 4,851,897 | 7/1989 | Inuma et al. | 358/209 |

Primary Examiner—James J. Groody
Assistant Examiner—Wendy R. Greening
Attorney, Agent, or Firm—Alvin Sinderbrand; William S. Frommer

[57] ABSTRACT

A video camera has a body with an imager therein for providing a video signal in response to the projection of a light image thereon by a selected exchangeable lens device removably mounted on the camera body, and first and second computers in the camera body and lens device, respectively, which are programmed so that, in an initial communication sequence therebetween after the selected lens device is mounted on the camera body, the second microcomputer transmits optical characteristic data for the respective lens device to the first microcomputer in response to a data transmission request signal from the latter, and further so that, in a control communication sequence which follows the initial communication sequence, the first microcomputer transmits a control signal to the second microcomputer on the basis of the received optical characteristic data and a controlled status signal supplied to the first microcomputer from the second microcomputer. Further, upon the mounting of the selected lens device on the camera body, the existence of adequate electrical connections therebetween is readily detected.

4 Claims, 13 Drawing Sheets

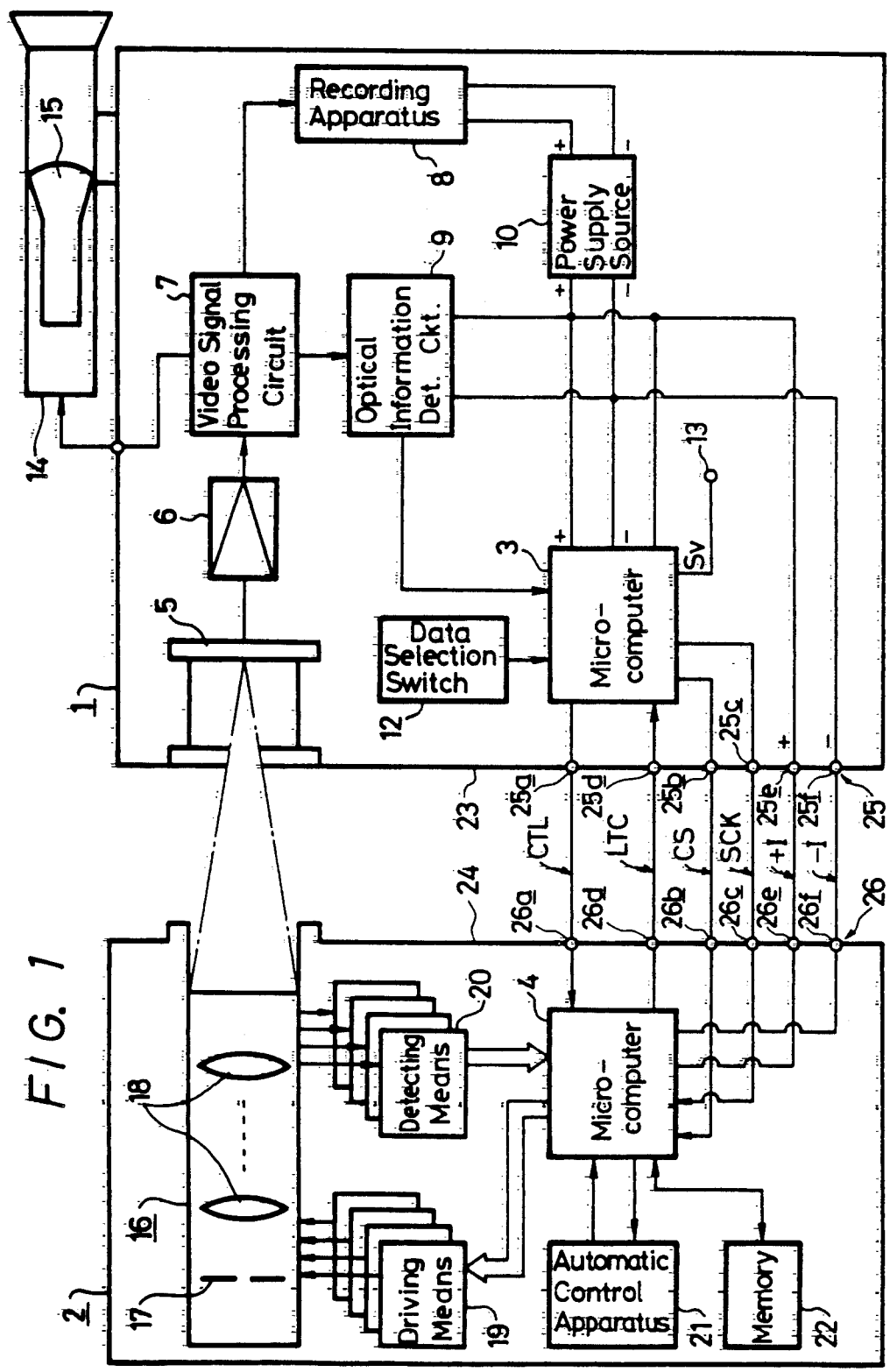

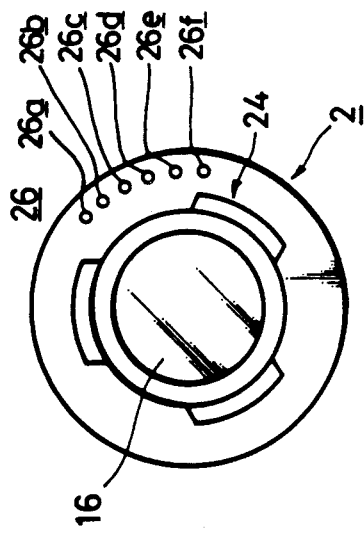
FIG. 3
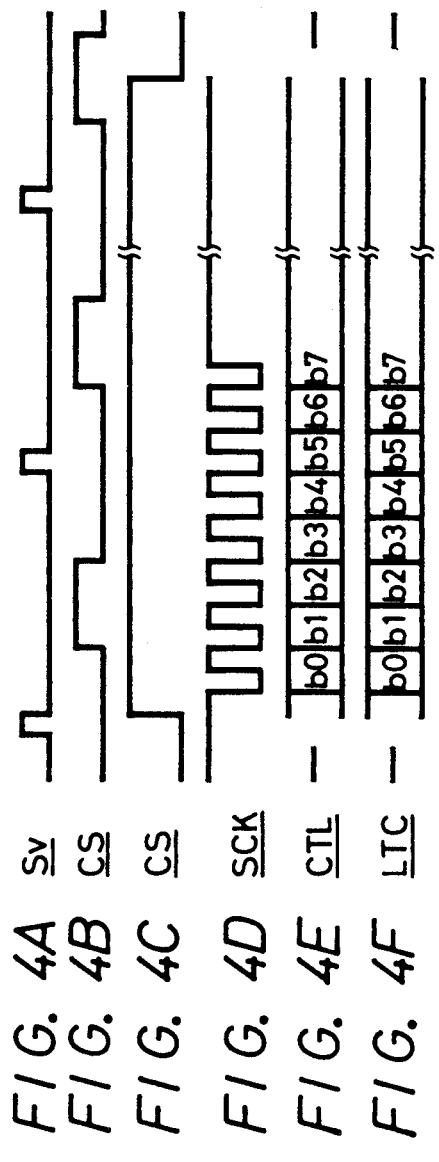
FIG. 4A  Sv
FIG. 4B  CS
FIG. 4C  CS
FIG. 4D  SCK
FIG. 4E  CTL
FIG. 4F  LTC
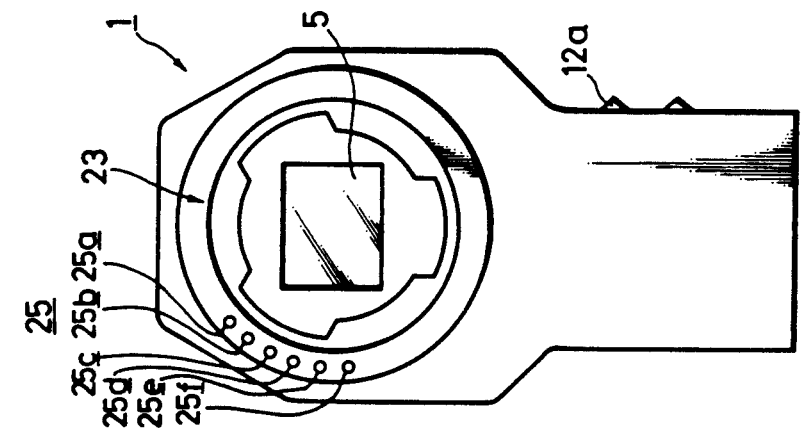
FIG. 2

FIG. 5A CS

FIG. 5B CTL |WORD 0| |WORD 1| |WORD 2| ----√√----- |WORD 9|

FIG. 5C LTC |WORD 0| |WORD 1| |WORD 2| ----√√----- |WORD 9|

FIG. 5D Initial Set Mode | 2 bytes | 8 bytes |
         Header Portion   Expression for One Unit FIG. 5E Control Mode | 2 bytes | 4 bytes | 4 bytes |
         Header Portion   Expression   Expression
                          for One Unit for One Unit b0 b1 b2 b3   b4 b5   b6 b7
Not-defined   Packet  Kind of
              Length  Data
         WORD 0

FIG. 7 b4 b5

| | | | |
|---|---|---|---|
| 0 | 0 | 6 bytes | (1 units) |
| 0 | 1 | 10 bytes | (2 units) |
| 1 | 0 | 14 bytes | (3 units) |
| 1 | 1 | 18 bytes | (4 units) |

Packet Length = (4n+2) bytes  n: Unit Number

FIG. 8 b6 b7

| | | |
|---|---|---|
| 0 | 0 | Initial Set Mode |
| 0 | 1 | Control Data |
| 1 | 0 | Factory Data (Optical) |
| 1 | 1 | Not-defined |

FIG. 9

WORD 1

| b0 | b1 | b2 | b3 | b4 | b5 | b6 | b7 |
|---|---|---|---|---|---|---|---|
| \multicolumn{4}{Check Code} | \multicolumn{4}{Not-defined} |

| b0 | b1 | b2 | b3 | |
|---|---|---|---|---|
| 1 | 0 | 1 | 0 | CTL |
| 0 | 1 | 0 | 1 | LTC |

FIG. 10

| | b0 | b1 | b2 | b3 | b4 | b5 | b6 | b7 | |
|---|---|---|---|---|---|---|---|---|---|
| WORD 0 | x | x | x | x | 1 | 0 | 0 | 0 | |
| WORD 1 | 1 | 0 | 1 | 0 | x | x | x | x | |
| WORD 2 | 0 | 0 | 0 | 0 | 0 | 0 | 0 | 0 | |
| WORD 3 { | 0 | 0 | 0 | 0 | 0 | 0 | 0 | 0 | Start Command |
|         | 0 | 0 | 0 | 0 | 1 | 0 | 0 | 0 | Lens Spec. Request Command |
|         | 1 | 0 | 0 | 0 | 1 | 0 | 0 | 0 | Unit Spec. Request Command |
| WORD 4 | 0 | 0 | 0 | 0 | 0 | 0 | 0 | 0 | |
| WORD 5 | 0 | 0 | 0 | 0 | 0 | 0 | 0 | 0 | |
| WORD 6 | 0 | 0 | 0 | 0 | 0 | 0 | 0 | 0 | |
| WORD 7 | 0 | 0 | 0 | 0 | 0 | 0 | 0 | 0 | |
| WORD 8 | 0 | 0 | 0 | 0 | 0 | 0 | 0 | 0 | |
| WORD 9 | 0 | 0 | 0 | 0 | 0 | 0 | 0 | 0 | |

Initial-system Command

FIG. 11

|  | b0 | b1 | b2 | b3 | b4 | b5 | b6 | b7 | |
|---|---|---|---|---|---|---|---|---|---|
| WORD 0 | x | x | x | x | 1 | 0 | 0 | 0 | |
| WORD 1 | 0 | 1 | 0 | 1 | x | x | x | x | |
| WORD 2 | 0 | 0 | 0 | 0 | 0 | 0 | 0 | 0 | |
| WORD 3 | 0 | 0 | 0 | 0 | 0 | 0 | 0 | 0 | Start Command |
| WORD 4 | 0 | 0 | 0 | 0 | 0 | 0 | 0 | 0 | |
| WORD 5 | 0 | 0 | 0 | 0 | 0 | 0 | 0 | 0 | |
| WORD 6 | 0 | 0 | 0 | 0 | 0 | 0 | 0 | 0 | |
| WORD 7 | 0 | 0 | 0 | 0 | 0 | 0 | 0 | 0 | |
| WORD 8 | 0 | 0 | 0 | 0 | 0 | 0 | 0 | 0 | |
| WORD 9 | 0 | 0 | 0 | 0 | 0 | 0 | 0 | 0 | |

FIG. 12

| b0 | b1 | b2 | | Function |
|---|---|---|---|---|
| 0 | 0 | 0 | Unit 0 | AF |
| 1 | 0 | 0 | Unit 1 | IRS |
| 0 | 1 | 0 | Unit 2 | ZOOM |
| 1 | 1 | 0 | Unit 3 | Not-defined |
| 0 | 0 | 1 | Unit 4 | Not-defined |
| 1 | 0 | 1 | Unit 5 | Not-defined |
| 0 | 1 | 1 | Unit 6 | Not-defined |
| 1 | 1 | 1 | Unit 7 | Not-defined |

FIG. 13

|  | b0 | b1 | b2 | b3 | b4 | b5 | b6 | b7 | |
|---|---|---|---|---|---|---|---|---|---|
| WORD 0 | x | x | x | x | 1 | 0 | 0 | 0 | |
| WORD 1 | 0 | 1 | 0 | 1 | x | x | x | x | |
| WORD 2 | 0 | 0 | 0 | 0 | 0 | 0 | 0 | 0 | |
| WORD 3 | 0 | 0 | 0 | 0 | 1 | 0 | 0 | 0 | Lens Spec. Request Command |
| WORD 4 | Factory Number ||||||||  Code Not Defined |
| WORD 5 | Lens Number |||||||| Code Not Defined |
| WORD 6 | Existence Non-existence of Unit |||||||| |
| WORD 7 | 0 | 0 | 0 | 0 | 0 | 0 | 0 | 0 | |
| WORD 8 | 0 | 0 | 0 | 0 | 0 | 0 | 0 | 0 | |
| WORD 9 | 0 | 0 | 0 | 0 | 0 | 0 | 0 | 0 | |

FIG. 14

|  | b0 | b1 | b2 | b3 | b4 | b5 | b6 | b7 | |
|---|---|---|---|---|---|---|---|---|---|
| WORD 0 | x | x | x | x | 1 | 0 | 0 | 0 | |
| WORD 1 | 0 | 1 | 0 | 1 | x | x | x | x | |
| WORD 2 | Unit Number |||||||| |
| WORD 3 | 1 | 0 | 0 | 0 | 1 | 0 | 0 | 0 | Unit Spec. Request Command |
| WORD 4 | Spec. MIN Value (Lower Digit) |||||||| |
| WORD 5 | Spec. MIN Value (Upper Digit) |||||||| |
| WORD 6 | Spec. MAX Value (Lower Digit) |||||||| |
| WORD 7 | Spec. MAX Value (Upper Digit) |||||||| |
| WORD 8 | Control Function Information |||||||| |
| WORD 9 | Absolute Area Effective Bits |||||||| |

FIG. 15

|  | b0 | b1 | b2 | b3 | b4 | b5 | b6 | b7 |
|---|---|---|---|---|---|---|---|---|
| WORD 0 | x | x | x | x | 1 | 0 | 0 | 0 |
| WORD 1 | 1 | 0 | 1 | 0 | x | x | x | x |

⎤ 2 bytes

| WORD 2 | Unit Number |
| WORD 3 | Control-system Command |
| WORD 4 | Control Amount (Required by Command) |
| WORD 5 | Control Amount (Required by Command) |

⎤ 4 bytes

| WORD 6 | Unit Number |
| WORD 7 | Control-system Command |
| WORD 8 | Control Amount (Required by Command) |
| WORD 9 | Control Amount (Required by Command) |

⎤ 4 bytes

FIG. 16

|  | b0 | b1 | b2 | b3 | b4 | b5 | b6 | b7 |
|---|---|---|---|---|---|---|---|---|
| WORD 0 | x | x | x | x | 1 | 0 | 1 | 0 |
| WORD 1 | 0 | 1 | 0 | 1 | x | x | x | x |

⎤ 2 bytes

| WORD 2 | Unit Number |
| WORD 3 | Status |
| WORD 4 | Area Data |
| WORD 5 | Moving Amount |

⎤ 4 bytes

| WORD 6 | Unit Number |
| WORD 7 | Status |
| WORD 8 | Area Data |
| WORD 9 | Moving Amount |

⎤ 4 bytes

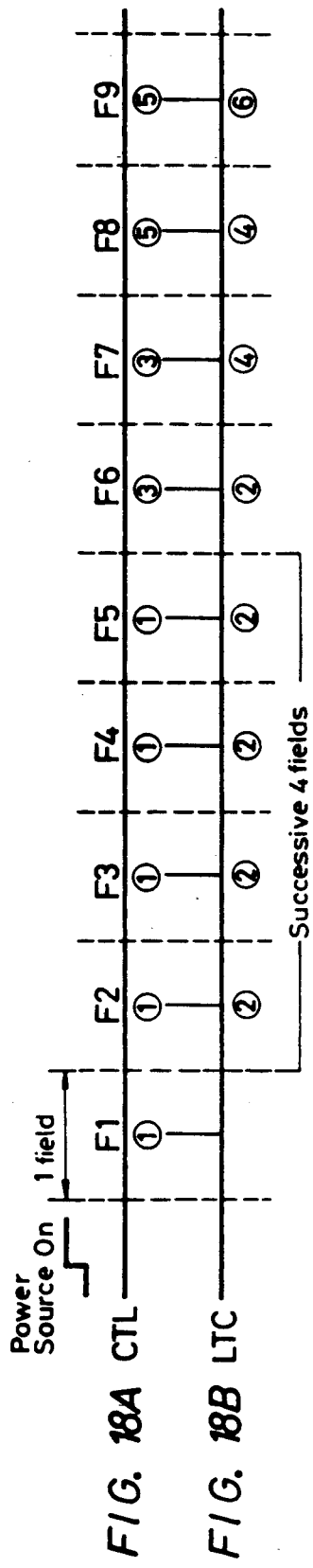
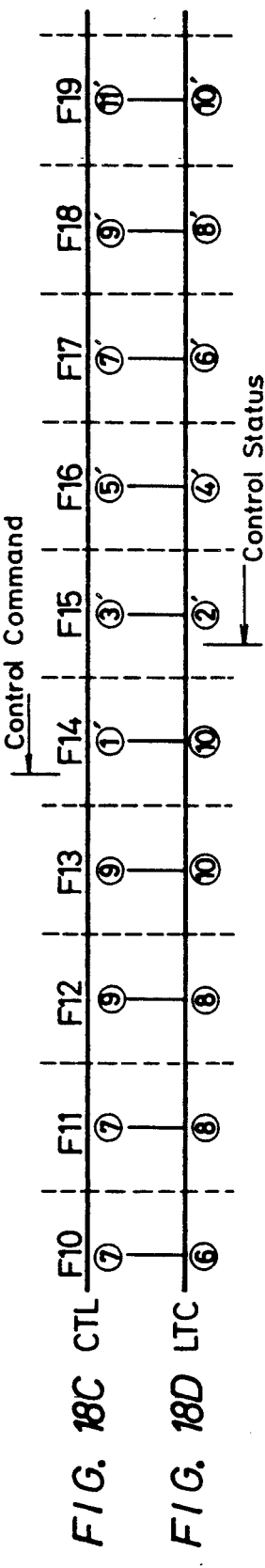
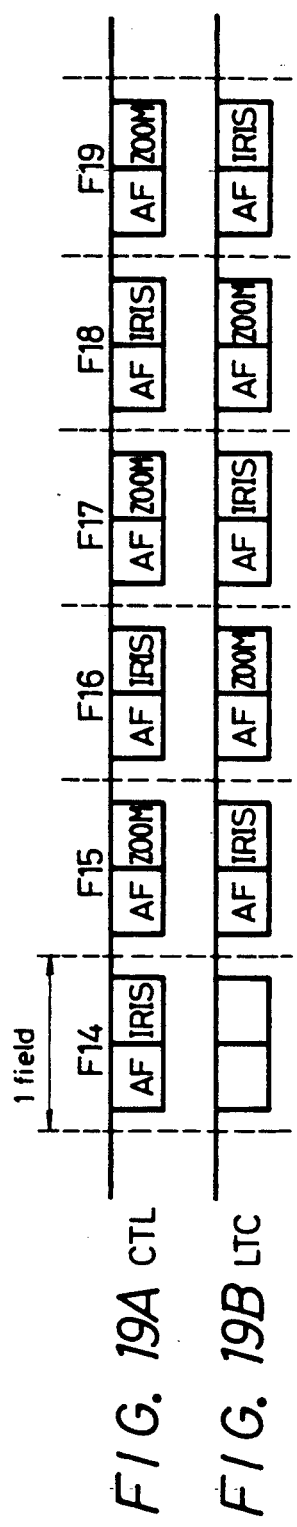
FIG. 18A CTL
FIG. 18B LTC
FIG. 18C CTL
FIG. 18D LTC
FIG. 19A CTL
FIG. 19B LTC

CAMERA WITH EXCHANGEABLE LENS DEVICE

BACKGROUND OF THE INVENTION

1. Field of the Invention

The present invention relates generally to video camera apparatus and, more particularly, is directed to a video camera having a camera body with an imager for producing a video signal and exchangeable lens devices selectively mounted on the body.

2. Description of the Prior Art

In a widely used optical still camera according to the prior art, a plurality of exchangeable lens devices with different optical characteristics are provided for selective mounting on a camera body.

Similarly, it has been proposed, for example, in U.S. patent application Ser. No. 07/301,597, filed Jan. 26, 1989, and having a common assignee herewith, to provide a video camera apparatus with a camera body containing an imager for producing a video signal corresponding to an image projected thereon, and a plurality of exchangeable lens devices selectively mounted on the camera body and having respective different optical characteristics for adopting the video camera apparatus to various conditions.

Generally, in a video camera apparatus, a real moving picture is picked up by the imager which may include a charge coupled device (CCD) or the like, and the picture is converted to an electrical signal which constitutes the output video signal. The exchangeable lens devices with different optical characteristics which are selectively mounted on the camera body include, for example, a telephoto-lens device, a wide-angle lens device, a zoom lens device and so on, each of which has a different focal length. When the cameraman selects one of the lens devices and mounts the same on the camera body for use therewith, components in the camera body have to control the selected lens device, for example, to effect automatic focus control, automatic exposure control, automatic white/black balance control and the like. In such case, control modes are different depending on the optical characteristics of the lens devices, for example, the focal length, F number, spectrum characteristics and the like. Further, the optical characteristics that need to be controlled are different for different kinds of lens devices.

OBJECTS AND SUMMARY OF THE INVENTION

Accordingly, it is an object of the present invention to provide an improved camera having a camera body and exchangeable lens devices selectively mounted on such body, and which can avoid problems encountered with the prior art.

More specifically, it is an object of the present invention to provide a camera with exchangeable lens devices having different optical characteristics which are selectively mounted on the camera body, and in which components included in the camera body can properly control the selected lens device thereon so that, when the cameraman takes a picture, desired conditions can be satisfied.

It is another object of the present invention to provide a video camera with exchangeable lens devices, as aforesaid, in which regardless of the kind of lens device mounted on the camera body, components in the camera body can control the selected lens device so that, when the cameraman takes a picture, conditions are realized for causing the imager to generate a video signal of the best image quality for one or more fields.

It is still another object of the present invention to provide a camera with exchangeable lens devices selectively mounted on a camera body, and in which the condition of electrical connections between the camera body and the mounted lens device can be easily detected.

According to an aspect of the present invention, a video camera with exchangeable lens devices comprises
a camera body having imager means for providing a video signal in response to the projection of a light image thereon;
a lens device removably mounted on the camera body for projecting the light image on the imager means;
first microcomputer means included in the camera body;
second microcomputer means included in the lens device;
means for establishing communication between the first and second microcomputer means upon the mounting of the lens device on the camera body;
means in the first microcomputer means of the camera body for transmitting a control signal to the second microcomputer means of the lens device;
means in the second microcomputer means of the lens device for transmitting a respective optical characteristic data signal to the first microcomputer means of the camera body; and
means in the second microcomputer means of the lens device for transmitting a controlled status signal to the first microcomputer means of the camera body:
the first and second microcomputer means being programmed so that, in an initial communication sequence after the lens device is mounted on the camera body, the first microcomputer means transmits the data transmission request signal to the second microcomputer means, and the second microcomputer means transmits the respective optical characteristic data signal to the first microcomputer means of the camera body when supplied with the data transmission request signal; and further so that, in a control communication sequence which follows the initial communication sequence, the first microcomputer means of the camera body transmits the control signal to the second microcomputer means of the lens device on the basis of the optical characteristic data signal and the controlled status signal supplied to the first microcomputer means from the second microcomputer means.

According to another aspect of the present invention, a video camera with exchangeable lens devices comprises:
a camera body having imager means for providing a video signal in response to the projection of a light image thereon;
a lens device removably mounted on the camera body for projecting the light image on the imager means;
first microcomputer means included in the camera body;
second microcomputer means included in the lens device;
means for establishing communication between the first and second microcomputer means upon the mounting of the lens device on the camera body;
means in the first microcomputer means for transmitting a connection confirming data transmission request signal to the second microcomputer means;

means in the second microcomputer means for transmitting a connection confirming signal to the first microcomputer means upon receipt of the connection confirming data transmission request signal; and means in the first microcomputer means for detecting whether or not the connection confirming signal from the second microcomputer means of the lens device is received by the first microcomputer means of the camera body.

According to a further aspect of the present invention, a video camera with exchangeable lens devices comprises a camera body having imager means for providing a video signal in response to the projection of a light image thereon;

a lens device removably mounted on the camera body for projecting the light image on the imager means;

first microcomputer means included in the camera body;

second microcomputer means included in the lens device;

the camera body having receiving and transmitting terminals, a power supply source for the first microcomputer means thereof, and a power source voltage output terminal;

the lens device having receiving and transmitting terminals and a power source voltage input terminal for the second microcomputer means thereof;

means for electrically connecting the transmitting terminal of the camera body with the receiving terminal of the lens device, the receiving terminal of the camera body with the transmitting terminal of the lens device, and the power source voltage output terminal of the camera body with the power source voltage input terminal of the lens device upon the mounting of the lens device on the camera body; and current detecting means included in the camera body for detecting whether or not a power source current is flowing between the power supply source and the power source voltage output terminal.

The above, and other objects, features and advantages of the present invention, will be apparent in the following detailed description of preferred embodiments when read in conjunction with the accompanying drawings, in which the same reference numerals are used to identify the same or similar parts in the several views.

BRIEF DESCRIPTION OF THE DRAWINGS

FIG. 1 is a block diagram showing a video camera with one of a plurality of exchangeable lens devices intended for use therewith according to an embodiment of the present invention;

FIG. 2 is an elevational view of an attaching surface of a camera body included in the embodiment shown in FIG. 1;

FIG. 3 is an elevational view of an attaching surface of the lens device included in the embodiment shown in FIG. 1;

FIGS. 4A-4F are waveform diagrams of signals transmitted between microcomputers included in the camera body and the lens device, respectively, in the embodiment of FIG. 1;

FIGS. 5A-5E are schematic diagrams to which reference will be made in explaining the arrangements of packet signals used in the camera embodying this invention;

FIG. 7 is a schematic representation to which reference will be made in explaining a packet length;

FIG. 8 is a schematic representation to which reference will be made in explaining kinds of data to be transmitted in the camera embodying the invention;

FIG. 9 is a schematic representation to which reference will be made in explaining the content of another word in the header portion;

FIG. 10 is a schematic representation to which reference will be made in explaining the content of a control signal in an initial set mode of the camera;

FIG. 11 is a schematic representation to which reference will be made in explaining the content of a status signal in the case of a status command in the initial set mode;

FIG. 12 is a schematic representation to which reference will be made in defining various unit numbers;

FIG. 13 is a schematic representation to which reference will be made in explaining the content of the status signal in the case of a lens specification packet in the initial set mode;

FIG. 14 is a schematic representation to which reference will be made in explaining the content of the status signal in the case of a unit specification packet in the initial set mode;

FIG. 15 is a schematic representation to which reference will be made in explaining the content of a control signal in the control mode;

FIG. 16 is a schematic representation to which reference will be made in explaining the content of a status signal in the control mode;

FIGS. 18A-18D are schematic diagrams to which reference will be made in explaining an initial set mode or communication sequence and a control communication sequence of the camera embodying this invention;

FIGS. 19A and 19B are schematic diagrams to which further reference will be made in explaining the control communication sequence.

DETAILED DESCRIPTION OF PREFERRED EMBODIMENTS

Figure 6:
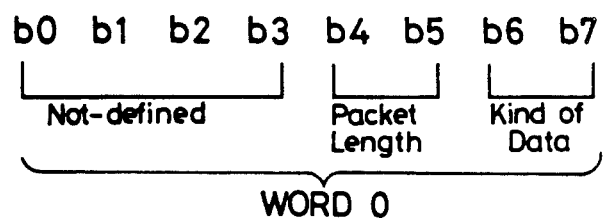
FIG. 6 is a schematic diagram to which reference will be made in explaining the content of a word in a header portion of a control signal and a status signal.

Referring to the drawings in detail, and initially to FIG. 1 thereof, it will be seen that a video camera according to an embodiment of the present invention is there shown to be generally comprised of a camera body 1 and a selected lens device 2 which is interchangeable with a plurality of other lens devices (not shown) having different optical characteristics. The camera body 1 and the exchangeable lens device 2 respectively incorporate microcomputers 3 and 4 which are adapted to communicate with each other.

In the camera body 1, there is an imager element 5 which may be a charge coupled device (CCD). The imager element 5 has a light image projected thereon by an image-pickup lens 16 of the lens device 2. A resulting video signal produced by the imager element 5 is amplified by an amplifier 6 and is supplied through a video signal processing circuit 7 to a recording apparatus 8. The recording apparatus 8 may be a helical-scan type video tape recorder (VTR), a magnetic disc recording apparatus, an optical-type recording apparatus or the like, and may have a playback function as well as a recording function.

The video signal from the video signal processing circuit 7 is also supplied to an optical information detecting circuit 9. The optical information detecting circuit 9 detects, from the video signal supplied thereto, various kinds of optical information, such as, the focused condition of a light image formed on the target screen of the imager element 5 by the image pickup lens 15, the amount or intensity of light in such image and the like, and supplies a corresponding detected signal to the microcomputer 3. The focused condition of the light image is detected by extracting a high frequency component from the video signal obtained from the imager element 5, and the state in which the level of this high frequency component is maximized is detected as the properly-focused state. Further, the amount of light in the light image may be detected by detecting the level of the video signal.

The microcomputer 3 is provided with a manually operable selection switch 12 by which a data selection signal corresponding to the switched condition, for example, for selecting the zoom mode of the image pickup lens 16, is supplied to the microcomputer 3.

A power supply source 10, which may be in the form of a battery or the like, has its positive and negative terminals connected to the microcomputer 3, the recording apparatus 8 and other circuits (not shown) of the camera body 1 which require electric power for their operation.

A synchronizing signal generating circuit (not shown) generates a horizontal synchronizing signal, a vertical synchronizing signal, a color subcarrier signal and the like on the basis of an oscillation signal from a quartz oscillator. The vertical synchronizing signal Sv is supplied through an input terminal 13 to the microcomputer 3 which generates various kinds of signals on the basis of the vertical synchronizing signal Sv, as will be later described. The frequency of the vertical synchronizing signal Sv is 60 Hz for the NTSC or 525/60-television system and is 50 Hz for the PAL or 625/50-television system.

A viewfinder 14 is provided on the camera body 1 and includes a cathode ray tube (CRT) 15 to which the video signal from the video signal processing circuit 7 is supplied.

The arrangement of the lens device 2 will now be described. The image pickup lens 16 might be, for example, a zoom lens which is formed of a plurality of lenses 18. At least some of the lenses 18 are moved relative to each other in the axial direction by respective driving motors 19 for thereby effecting the focus adjustment, zoom adjustment and so on. The image pickup lens 16 is provided with a stop 17 whose diameter is also controlled by one of the driving motors 19. The driving motors 19 are controlled by respective control signals from the microcomputer 4.

Optical data, such as, the focal length, aperture and the like of the image pickup lens 16, are detected by respective detecting elements of a detecting assembly 20, and the respective detected signals therefrom are supplied through the microcomputer 4 to a memory 22 and stored therein.

An automatic control apparatus 21 is provided in the lens device 2 in order to automatically adjust the focus and the like. In response to a detected signal from the detecting assembly 20 which corresponds to a respective detected optical condition of the image pickup lens 16, and which is supplied through the microcomputer 4 to the control apparatus 21, the latter automatically controls the respective motor 19 so that, for example, maintenance of the desired focus adjustment of the image pickup lens 16 can be automatically effected at the lens device 2.

The camera body 1 and the exchangeable lens device 2 are electrically connected to each other by the mutual engagement of six sets of contacts 25 and 26 provided on contact surfaces 23 and 24, respectively, which are in facing relation when the selected lens device 2 is mounted on the camera body 1. More particularly, as shown in FIG. 1, a serial control signal CTL of packet communication type, a chip select signal CS and a system clock signal SCK are transmitted from the camera body microcomputer 3 to the lens device microcomputer 4 through contacts 25a, 25b and 25c, respectively, on the surface 23 of camera body 1 which engage contacts 26a, 26b and 26c, respectively, on the surface 24 of the lens device 2. A serial status signal LTC of packet communication type is supplied from the microcomputer 4 of the lens device 2 to the microcomputer 3 through contacts 25d and 26d. Further, positive and negative currents +I and −I from the power supply source 10 of the camera body 1 are supplied to the microcomputer 4 and to other circuits (not shown) in the lens device 2 through contacts 25e and 25f on the surface 23 engageable with contacts 26e and 26f on the surface 24.

As shown in FIG. 4B, the chip select signal CS is generated by the microcomputer 3 in synchronism with the vertical synchronizing signal Sv shown in FIG. 4A. This chip select signal CS has a predetermined phase relation to the vertical synchronizing signal Sv, and it rises and falls within one field period. The chip select signal CS attains a high level for a predetermined period which is shorter than one field period and assumes a low level during the remainder of the field period. The high level and low level periods of the chip select signal CS may be interchanged depending on the signal system. FIG. 4C illustrates the chip select signal CS expanded in the time direction so as to provide a scale suitable for illustration of details of the signals SCK, CTL and LTC in FIGS. 4D, 4E and 4F, respectively.

In the high level period of the chip select signal CS (FIG. 4C), the control signal CTL (FIG. 4E) and the status signal LTC (FIG. 4F) are transmitted packet by packet in synchronism with the vertical synchronizing signal Sv. Bit signals b0, b1, ... , b7 of words forming each of the control signal CTL and the status signal LTC are synchronized with the system clock signal SCK (FIG. 4D).

The arrangement of the words forming each packet of the control signal CTL and the status signal LTC will be explained with reference to FIGS. 5A–5E.

From FIGS. 5B and 5C, it will be seen that each of the control signal CTL and the status signal LTC is formed of, for example, 10 bytes per packet (that is, word signals WORD0 to WORD9). Two bytes (word signals WORD0 and WORD1) in the head portion of the packet are designated a header portion (FIGS. 5D and 5E). The remaining 8 bytes (word signals WORD2 to WORD9), of the control signal CTL represent control objects or "units" which the camera body 1 controls in the lens device 2, and control contents or "expressions of each unit" for each control object. The remaining 8 bytes, that is, word signals WORD2 to WORD9, of the status signal LTC, represent optical characteristics and controlled conditions or "units" of the lens device 2, and characteristic contents of each optical characteristic and contents of each controlled condition which are also referred to as "expressions of each unit".

One expression for one unit in the control signal CTL and the status signal LTC is formed of 8 bytes in an initial period or initial set mode (FIG. 5D) in which various optical characteristic data of the lens device 2 are supplied to the camera body 1 immediately after the lens device 2 is mounted on the camera body 1. However, in a control period or mode (FIG. 5E) in which the camera body 1 controls the lens device 2 on the basis of various optical characteristic data and controlled status data supplied thereto from the lens device 2, one expression for one unit is formed of 4 bytes so that, in the control period or mode, data corresponding to the expression of two units can be transmitted by one packet.

The contents of the header portion of 2 bytes (word signals WORD0 and WORD1) of the control signal CTL and the status signal LTC will now be explained.

As shown in FIG. 6, in the word WORD0, bit signals b4 and b5 represent a packet length, and bit signals b6 and b7 represent the kind of data. The bit signals b0 to b3 are not defined.

As shown in FIG. 7, the packet length is expressed by (4n+2) bytes where n assumes a unit number in accordance with the values of the bits signals b4 and b5. Four kinds of packet lengths, consisting of 5 bytes, 10 bytes, 14 bytes and 18 bytes, can be selected in accordance with the unit number n=1 to 4. In the present embodiment, the packet length is fixedly selected to be 10 bytes, that is, n=2.

The kind of data represented by bits b6 and b7 can be initial set mode data, control data, and factory data, as shown in FIG. 8.

Further, the word signal WORD1 expresses a check code by its bit signals b0 to b3, as shown in FIG. 9, and the bit pattern thereof is made different for the control signal CTL and for the status signal LTC, respectively. The remaining bit signals b4 to b7 are not defined.

When the camera body microcomputer 3 and the lens device microcomputer 4 receive the check codes from each other, they confirm that these check codes are correctly received. Then, they analyze data such as the word signals WORD2, WORD3, . . . . If the check code is not received for over 0.5 second, the processing by each of the microcomputers 3 and 4 is returned to the initial setting mode, and the communication is re-started.

The contents of the unit expression portion of the control signal CTL in the initial set mode will now be explained with reference to FIG. 10, in which X represents a portion which is not defined.

The unit expression portion (WORD2 to WORD9) of the control signal CTL in the initial set mode expresses three initial-system commands, that is, a start command, a lens specification request command and a unit specification request command by the use of different bit patterns of the word signal WORD3.

The content of the unit expression portion of the status signal LTC in the initial set mode will be explained with reference to FIG. 11 which, by way of example, shows the content of the status signal LTC in respect to the start command in the initial set mode. Thus, as shown in FIG. 11, in the case of the start command in the initial set mode, the unit expression portion of the status signal LTC, has all of the bit signals of the word signal WORD3 at "0".

The definition of the unit number will now be explained with reference to FIG. 12 in which it is shown that the bit signals b0, b1 and b2 are used to express the unit number 0, 1, . . . , 7, and the unit numbers 0, 1 and 2 respectively correspond to auto-focus (AF), iris (IRS) and zoom (ZOOM), and unit numbers 3 to 7 are not defined.

Though not shown, the bit signal b3 of the word signal expressing the unit number may be desirably employed to express a valid/invalid flag. For example, a valid flag is b3="1" and an invalid flag is b3="0"). If the invalid flag "0" is set, then the unit number will not mean anything regardless of the values of the bit signals b0, b1 and b2.

The content of the status signal LTC in the case of the lens specification packet in the initial set mode will now be described with reference to FIG. 13.

As shown in FIG. 13, in the unit expression portion (WORD2 to WORD9) of the status signal LTC in the case of the lens specification packet in the initial set mode, WORD3 represents the lens specification request command, WORD4 represents the factory number, WORD5 represent the lens number and WORD6 represents the existence/non-existence of the unit. Such factory number and lens number should be registered.

Though not shown, in WORD6, the bit signals b0, b1, b2 . . . , b7 respectively correspond to the units 0, 1, 2, . . . , 7, whereby, when the value of the respective bit is "1", it indicates that the corresponding unit exists in the image pickup lens 16 of the lens device 2. On the other hand, when the value of the bit b0, b1, b2, . . . , b7 is "0", it indicates that the corresponding unit does not exist in the image pickup lens 16.

As shown in FIG. 14, in the unit expression portion (WORD2 to WORD9) of the status signal LTC in the case of the lens specification packet in the initial set mode, WORD 2 represents the unit number, WORD3 represents the unit specification request command, WORD4 represents the lower digit of the specification minimum (MIN) value, WORD5 represents the upper digit of the specification minimum (MIN) value, WORD6 represent the lower digit of the specification maximum (MAX) value, WORD7 represents the upper digit of the specification maximum (MAX) value, WORD8 represents the control function information, that is, how to control the unit function, and WORD9 represents the absolute area effective bits, that is, the maximum value of the area encoder.

The word signals WORD4 and WORD5 represent the lower 2 digits and the upper 2 digits of the minimum values in which the respective units, that is, distance, F number and focal length, of the auto-focus (AF), iris (IRS) and zoom (ZOOM) are expressed by four digits in the binary coded decimal (BCD) notation. The word signals WORD6 and WORD7 represent the lower 2 digits and the upper 2 digits of the maximum values in which distance, F number and focal length of the auto-focus (AF), iris (IRS) and zoom (ZOOM) are expressed by four digits in the binary coded decimal (BCD) notation.

Further, in WORD8, the bit b3 by its value "1" or "0" represents ON/OFF of the automatic function, the bits b4 and b5 by their values represent the relative position control and absolute position control, and the relative amount control and absolute amount control, the bit b6 by its value represents whether the camera body 1 can perform the control operation or not, and the bit b7 by its value represents the existence or non-existence of the automatic function.

In the word signal WORD9, the maximum values of the area encoder in the unit are expressed by the bit signals b0 to b3.

The content of the unit expression of the control signal CTL in the control mode will now be explained with reference to FIG. 15 in which the control signal CTL in the control mode is shown to include a first unit expression portion of 4 bytes formed of WORD2 to WORD5, and a second unit expression portion of 4 bytes formed of WORD6 to WORD9. WORD2 and WORD6 respectively represent the unit numbers, WORD3 and WORD7 respectively represent the control-system commands and WORD4, WORD5 and WORD8, WORD9 represent control amounts and control amounts required by the commands, respectively.

With respect to the unit number, the bit signals b0, b1 and b2 of each of WORD2 and WORD6 are employed to represent unit numbers 0, 1, . . . , 7 similarly to what has been described above with reference to FIG. 12.

Though not shown, the bit signals b4 and b5 of each of WORD2 and WORD6 are employed to represent the relative position, absolute position, relative amount and absolute amount, respectively.

The content of the unit expression portion of the status signal LTC in the control mode will now be described with reference to FIG. 16 in which the status signal LTC in the control mode is shown to include a first unit expression portion of 4 bytes formed of WORD2 to WORD5 and a second unit expression portion of 4 bytes formed of WORD6 to WORD9. WORD2 and WORD6 respectively represent unit numbers, WORD3 and WORD7 respectively represent status, WORD4 and WORD8 respectively represent area data and WORD5 and WORD9 represent relative control amounts as required by the commands, respectively.

With respect to the unit numbers in FIG. 16, the bit signals b0, b1 and b2 of each of WORD2 and WORD6 are employed to represent unit numbers 0, 1, . . . , 7 similarly to what has been described with reference to FIG. 12.

The bit signal b3 of each of WORD2 and WORD6 is employed to represent a valid/invalid flag (valid flag b3="1" and invalid flag b3="0"), and if the invalid flag "0" is set at bit b3, the unit number will be invalid regardless of the values of the bit signals b0, b1 and b2.

Further, the bit signals b4 and b5 of each of WORD2 and WORD6 are employed to represent the relative position, absolute position, relative amount and absolute amount, respectively.

Furthermore, each of WORD3 and WORD7 utilizes the bit signal b0 to represent the ON/OFF state of the respective function, the bit signal b1 to represent the end point "−", the bit signal b2 to represent the end point "+" and the bit signal b3 to represent macro in the case of the zoom lens. The end points +/− represent positive and negative directions in which each unit is to be controlled, and the end points "+" and "−" represent ∞ (infinity) and near (NEAR) in the case of the auto-focus function, or open (OPEN) and close (CLOSE), respectively, with respect to the adjustable iris function. Moreover, the end points "+" and "−", that is b2 and b1, represent telephoto (TELE) and wide angle (WIDE), respectively, with respect to the zoom lens. In addition, WORD4 and WORD8 utilize the bit signals b0 to b3 to represent the position of the unit.

A communication sequence to be performed between the microcomputers 3 and 4 of the camera body 1 and the lens device 2 will now be described in detail. This communication sequence roughly comprises an initial communication sequence initiated when the power switch is turned ON, and a succeeding control communication sequence.

The initial communication sequence will be described first with reference to the flow chart of FIGS. 17A and 17B, in which, following the Start of operation, the lens device 2 is mounted on the camera body 1, and the power supply source 10 is turned ON in step ST-1. Then, in step ST-2 the camera body microcomputer 3 transmits the control signal CTL start packet signal indicated at ① on FIG. 18A to the lens device microcomputer 4 during field periods F1 and F2. In the next decision step ST-3, it is determined by the judging means of the microcomputer 4 whether or not the microcomputer 4 receives the CTL start packet signal ①. If it is determined that the microcomputer 4 is not receiving the CTL start packet signal ①, as represented by a NO answer at step ST-3, then the routine returns to step ST-2. On the other hand, if it is determined that the microcomputer 4 is receiving the CTL start packet signal ①, as represented by a YES answer at step ST-3, then the routine proceeds to step ST-4. In step ST-4, the lens device microcomputer 4 transmits, as a status signal LTC, the LTC start packet signal (FIG. 11) indicated at ② on FIG. 18B, and which has the same bit pattern as the received signal ①. Such LTC start packet signal or answer back signal ② is transmitted to the camera body microcomputer 3 during the field period F2.

In the next decision step ST-5, it is determined by the judging means of the camera body microcomputer 3 whether or not the microcomputer 3 receives the LTC start packet signal ② during the field period F2. If it is determined that the microcomputer 3 is not receiving the LTC start packet signal ②, as represented by a NO answer at step ST-5, then the routine goes back to step ST-2. On the other hand, if it is determined that the microcomputer 3 is receiving the LTC start packet signal ②, as represented by a YES answer at step ST-5, then the routine proceeds to step ST-6. In step ST-6, a count value of counting means in the camera body microcomputer 3 is incremented by "1" (decimal notation). In the next decision step ST-7, it is determined by the judging means of the microcomputer 3 whether or not the count value reaches "4" (also decimal notation). If a NO answer is obtained at step ST-7, then the routine returns to step ST-2, whereat the CTL start packet signal 1 and the LTC start packet signal 2 are again transmitted and received between the camera body microcomputer 3 and the lens device microcomputer 4. If it is determined by the judging means of the microcomputer 3 that the count value reaches "4", as during the field period F5, and as represented by a YES answer at step ST-7, then the routine proceeds to step ST-8.

By determining whether or not the count value of the counting means reaches "4", it is possible to detect whether or not the camera body 1 and the lens device 2 are electrically connected with each other through mutual engagement of the contracts 25 and 26. If it is determined that the count value of the counting means does not reach "4", as when the camera body 1 and the lens device 2 are not electrically connected, an electrical connection impossible signal may be generated from the microcomputer 3 for causing an electrical connection impossible message to be displayed on a picture screen of the CRT 15 of the viewfinder 14.

Figure 20:
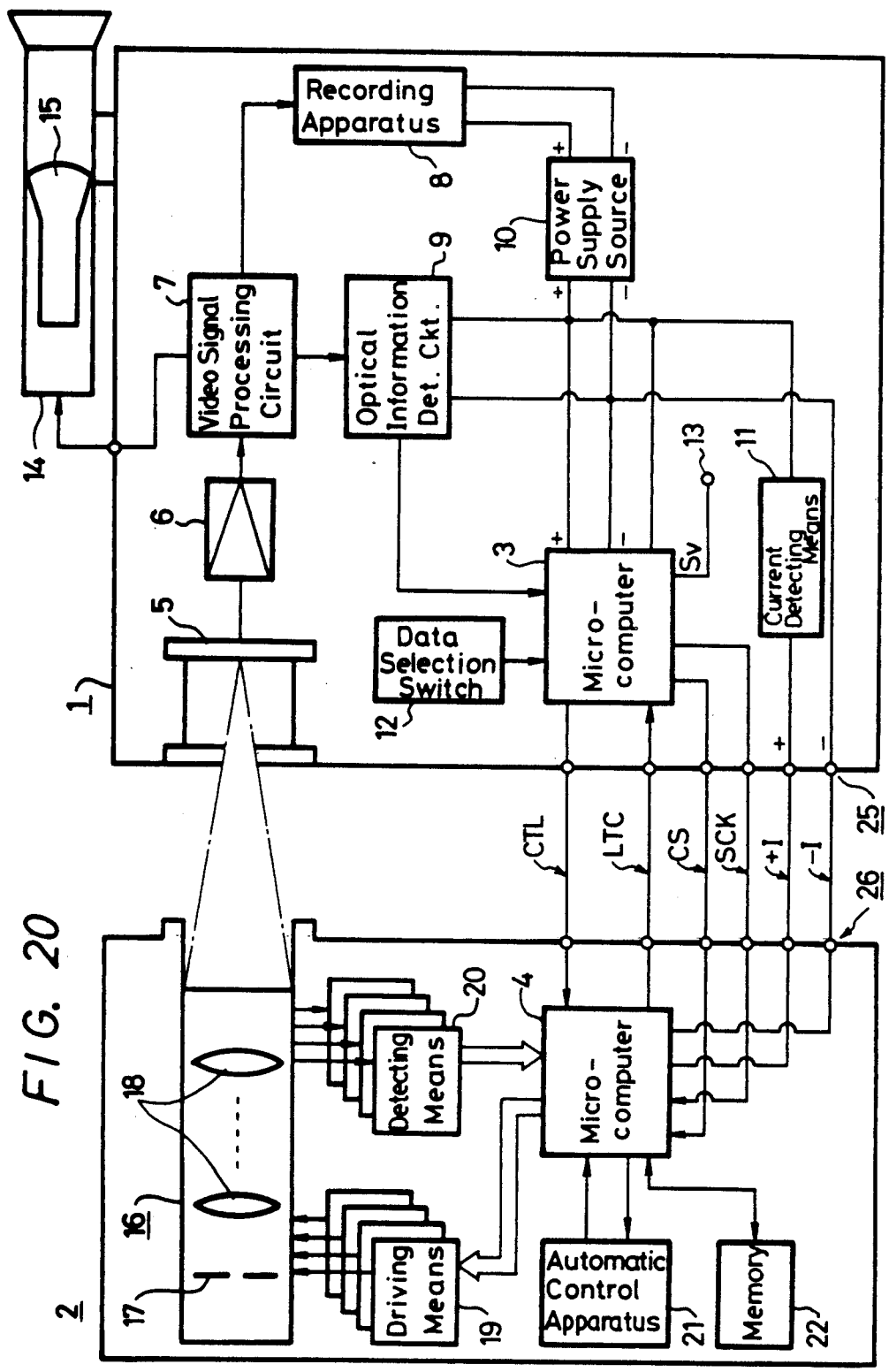
FIG. 20 is a schematic block diagram showing a camera according to a second embodiment of the present invention.

Alternatively, as shown in FIG. 20 which illustrates a second embodiment of the present invention, and in which parts corresponding to those described with reference to FIG. 1 are identified by the same reference numerals, the camera body 1 may further include a current detecting device 11 interposed in a current supplying path through which the power supply source 10 supplies power to the lens device 2. The detected output from the current detecting device 11 is supplied to the microcomputer 3. Thus, when a current is not detected by the current detecting device 11, the electrical connection impossible signal is generated by the microcomputer 3, and an electrical connection impossible message is displayed on the picture screen of the CRT 15 of the viewfinder 14.

Figure 17A:
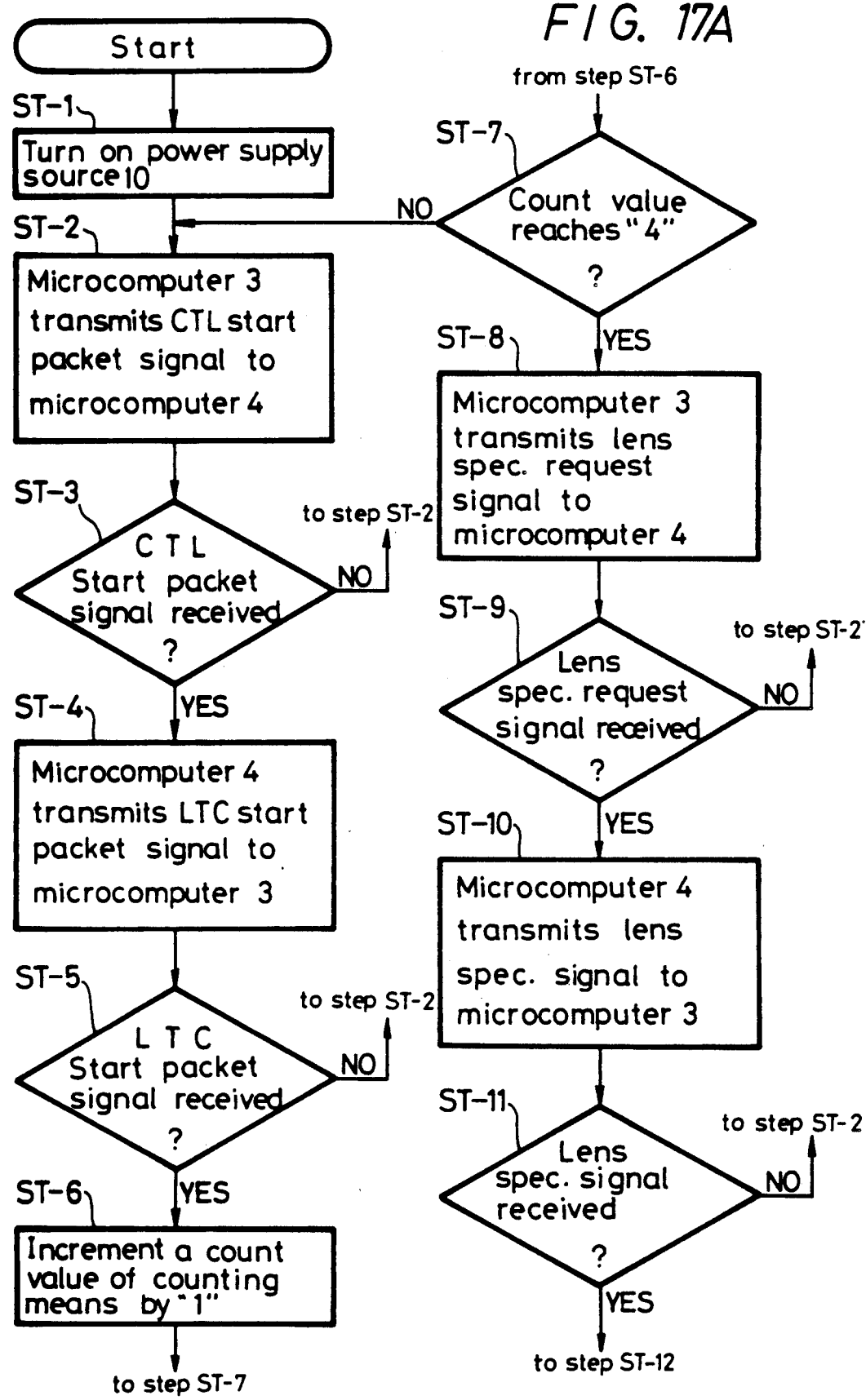
FIGS. 17A-17C show a flow chart to which reference will be made in explaining the operation of the embodiment of the present invention shown on FIG. 1.

Returning now to the flow chart of FIG. 17A, when it is determined in step ST-7 that the count value of the counting means reaches "4" during the field period F5, in the next step ST-8, the camera body microcomputer 3 transmits, as the control signal CTL, the lens specification request command signal (FIG. 10) to the lens device microcomputer 4 during the field periods F6 and F7, as indicated at ③ on FIG. 18A.

In the next decision step ST-9, it is determined by the judging means of the lens device microcomputer 4 whether or not the microcomputer 4 is receiving the lens specification request command signal ③ from the camera body microcomputer 3 during the field periods F6 and F7. If it is determined that the microcomputer 4 is not receiving the lens specification request command ③, signal as represented by a NO answer at step ST-9, then the routine returns to step ST-2. If it is determined that the microcomputer 4 is receiving the lens specification request command signal ③, as represented by a YES answer at step ST-9, then the routine proceeds to step ST-10. In step ST-10, the lens device microcomputer 4 transmits the status signal LTC (FIG. 13, that is, the lens specification signal stored in the memory 22, to the camera body microcomputer 3 during the field periods F7 and F8, as indicated at ④ on FIG. 18B.

In the next decision step ST-11, it is determined by the judging means of the camera body microcomputer 3 whether or not the microcomputer 3 is receiving the lens specification signal ④ during the field periods F7 and F8. If it is determined that the microcomputer 3 is not receiving the lens specification signal ④, as represented by a NO answer at step ST-11, then the routine returns to step ST-2. On the other hand, if it is determined that the microcomputer 3 is receiving the lens specification signal ④, as represented by a YES answer at step ST-11, then the routine proceeds to step ST-12 shown on FIG. 17B. In step ST-12, the camera body microcomputer 3 transmits, as the control signal CTL whose unit number is X, the first unit specification request command signal (FIG. 10) to the lens device microcomputer 4 during the field periods F8 and F9, as indicated at ⑤ on FIG. 18A.

In the next decision step ST-13, it is determined by the judging means of the lens device microcomputer 4 whether or not the microcomputer 4 is receiving the first unit specification request command signal ⑤ during the field periods F8 and F9. If it is determined that the microcomputer 4 is not receiving the first unit specification request command signal ⑤, as represented by a NO answer at step ST-13, then the routine returns to step ST-2. If it is determined that the microcomputer 4 is receiving the first unit specification request packet signal ⑤, as represented by a YES answer at step ST-13, then the routine proceeds to step ST-14. In step ST-14, the lens device microcomputer 4 transmits the status signal LTC with a unit number X (the first unit specification signal) to the camera body microcomputer 3 during the field periods F9 and F10, as indicated at ⑥ on FIGS. 18B and 18D.

Then, the routine proceeds to the next decision step ST-15 in which it is determined by the judging means of the camera body microcomputer 3 whether or not the microcomputer 3 is receiving the first unit specification signal ⑥ during the field periods F9 and F10. If it is determined that the microcomputer 3 is not receiving the first unit specification signal ⑥, as represented by a NO answer at step ST-15, then the routine returns to step ST-2. On the other hand, if it is determined that the microcomputer 3 is receiving the first unit specification signal ⑥, as represented by a YES answer at step ST-15, then the camera body microcomputer 3 transmits the control signal CTL with a unit number y, that is, the second unit specification request command signal (FIG. 10) to the lens device microcomputer 4 during the field periods F10 and F11, as indicated at ⑦ on FIG. 18C.

Figure 17B:
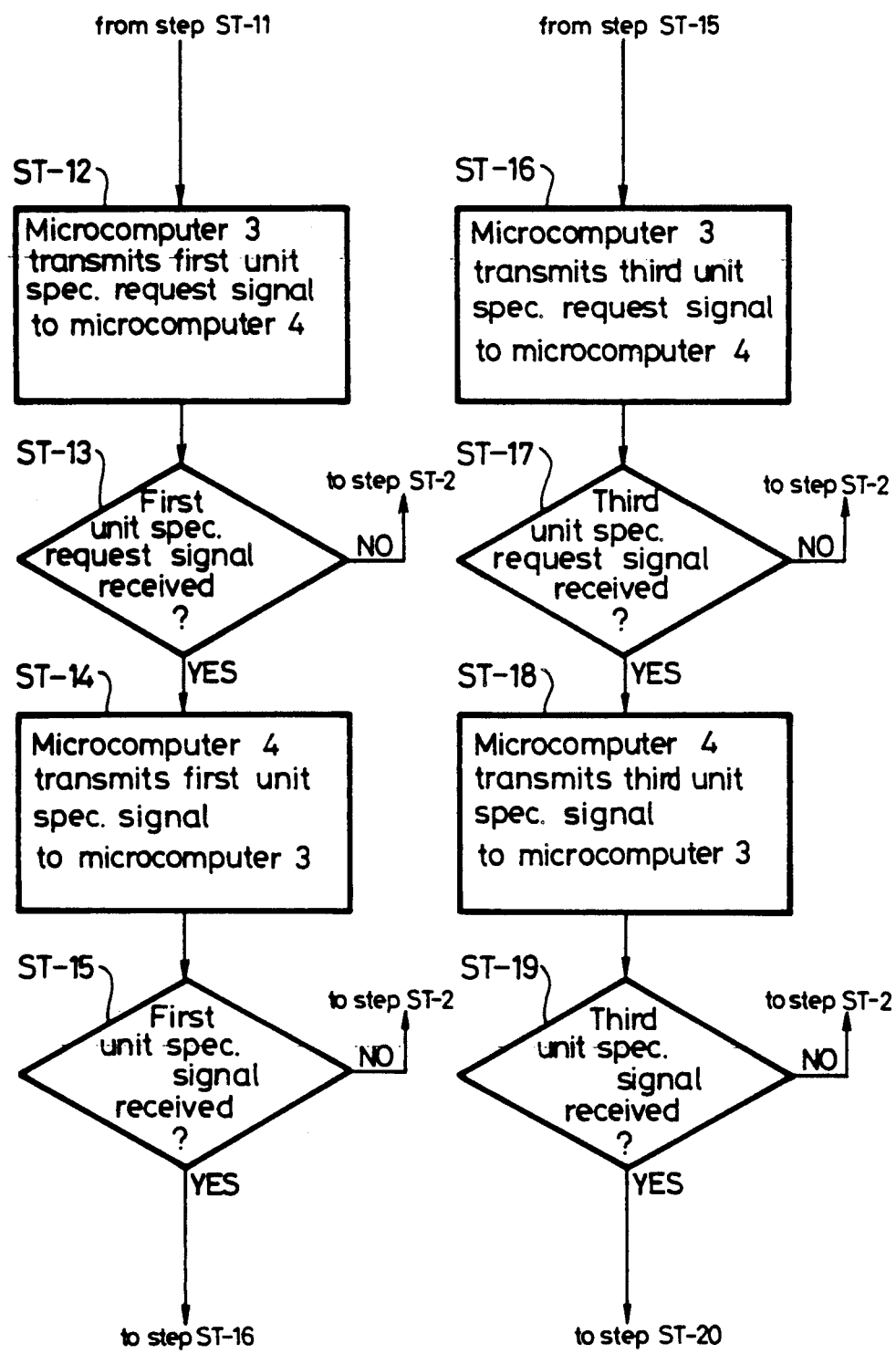
Figure 17C:
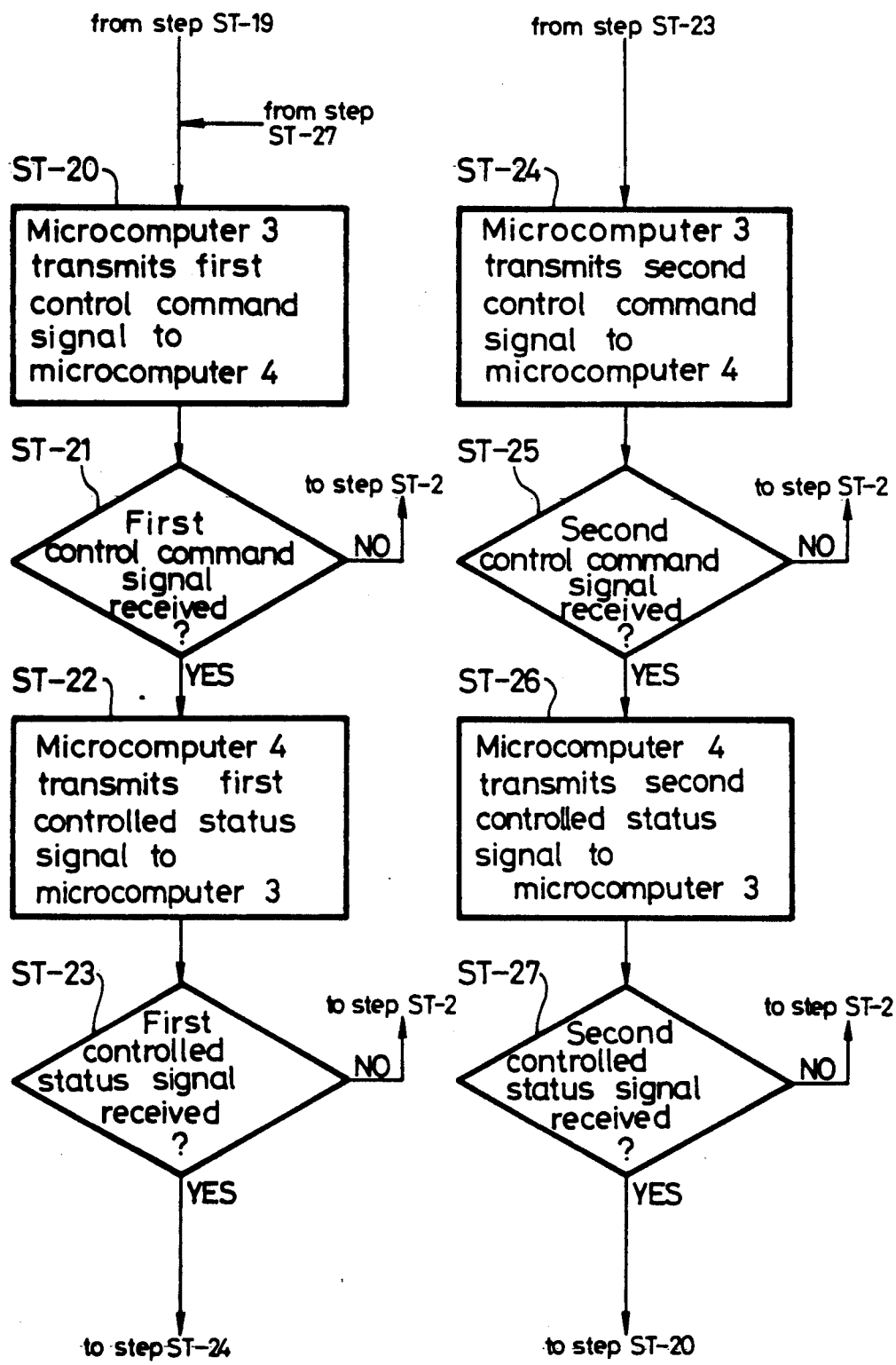

The step of supplying the second unit specification request packet signal ⑦ from the computer 3 to the computer 4 is not shown on FIG. 17B, nor is the next decision step in which it is determined by the judging means of the lens device microcomputer 4 whether or not the computer 4 is receiving the second unit specification request command signal ⑦ during the field periods F10 and F11. If it is determined that the microcomputer 4 is not receiving the second unit specification request packet signal ⑦, then the routine returns to step ST-2. On the other hand, if it is determined that the microcomputer 4 is receiving the second unit specification request packet signal ⑦, then in a step not shown on FIG. 17B, the lens device microcomputer 4 transmits the status signal LTC with a unit number Y, that is, the second unit specification signal, to the camera body microcomputer 3 during the field periods F11 and F12, as indicated at ⑧ on FIG. 18D.

In the next decision step also not shown on FIG. 17B, it is determined by the judging means of the camera body microcomputer 3 whether or not the microcomputer 3 is receiving the second unit specification signal ⑧ during the field periods F11 and F12. If it is determined that the microcomputer 3 is not receiving the second unit specification signal ⑧, then the routine returns to step ST-2. On the other hand, if it is determined that the microcomputer 3 is receiving the second unit specification signal ⑧, then the routine proceeds to step ST-16.

In step ST-16, the camera body microcomputer 3 transmits the control signal CTL with a unit number Z, that is, the third unit specification request command signal, to the lens device microcomputer 4 during the field periods F12 and F13, as indicated at ⑨ on FIG. 18C. Then, the routine proceeds to the next decision step ST-17 in which it is determined by the judging means of the lens device microcomputer 4 whether or not the microcomputer 4 is receiving the third unit specification request command signal ⑨ during the field periods F12 and F13. If it is determined that the microcomputer 4 is not receiving the third unit specification request packet signal ⑨ during the field periods F12 and F13, as represented by a NO answer at step ST-17, then the routine returns to step ST-2. If it is determined that the microcomputer 4 is receiving the third unit specification request command signal 9 during the field periods F12 and F13, as represented by a YES answer at step ST-17, then the routine proceeds to step ST-18. In step ST-18, the lens device microcomputer 4 transmits the status signal LTC with a unit number Z, that is, the third unit specification signal, to the camera body microcomputer 3 during the field periods F13 and F14, as indicated at ⑩ on FIG. 18D.

In the decision step ST-19, it is determined by the judging means of the camera body microcomputer 3 whether or not the microcomputer 3 is receiving the third unit specification signal ⑩ during the field period F13. If it is determined that the microcomputer 3 is not receiving the third unit specification signal ⑩ during the field period F13, as represented by a NO answer at step ST-19, then the routine returns to step ST-2. If it is determined that the microcomputer 3 is receiving the third unit specification signal ⑩, as represented by a YES answer at step ST-19, then the routine proceeds to step ST-20.

The foregoing concludes the initial communication sequence, and the following control communication sequence will now be described with reference to FIGS. 17C, 18C, 18D, 19A and 19B. In step ST-20 (FIG. 17C), the camera body microcomputer 3 transmits, as the control signal CTL, the first control command signal (FIG. 15) with, for example, a unit number 0 (AF) and a unit number 1 (IRIS) (FIG. 19A), to the lens device microcomputer 4 during the field period F14, as indicated at ①' on FIG. 18C.

In the next decision step ST-21, it is determined by the judging means of the lens device microcomputer 4 whether or not the microcomputer 4 is receiving the first control command signal ①' during the field period F14. If it is determined that the first control command signal ①' is not received by the microcomputer 4 during the field period F14, as represented by a NO answer at step ST-21, then the routine returns to step ST-2. On the other hand, if it is determined that the microcomputer 4 is receiving the first control command signal ①' during the field period F14, as represented by a YES answer at step ST-21, then the routine proceeds to step ST-22. In step ST-22, the lens device microcomputer 4 transmits, as the status signal LTC, the first controlled status signal (FIG. 16) with a unit number 0 (AF) and a unit number 1 (IRIS) (FIG. 19B) to the camera body microcomputer 3 during the field period F15, as indicated at ②' on FIG. 18D.

Then, the routine proceeds to the next decision step ST-23 in which it is determined by the judging means of the camera body microcomputer 3 whether or not the microcomputer 3 is receiving the first controlled status signal ②' during the field period F15. If it is determined that the microcomputer 3 is not receiving the first controlled status signal ②' during the field period F15, as represented by a NO answer at step ST-23, 23, then the routine returns to step ST-2. On the other hand, if it is determined that the microcomputer 3 is receiving the first controlled status signal ②' during the field period F15, as represented by a YES answer at step ST-23, then the routine proceeds to step ST-24. In step ST-24, the camera body microcomputer 3 transmits, as the control signal CTL, the second control command signal (FIG. 15), for example, with a unit number 0 (AF) and a unit number 2 (ZOOM) (FIG. 19A), to the lens device microcomputer 4 during the field period F15, as indicated at ③' on FIG. 18C.

In the next decision step ST-25, it is determined by the judging means of the lens device microcomputer 4 whether or not the microcomputer 4 is receiving the second control command signal ③' during the field period F15. If it is determined that the microcomputer 4 is not receiving the second control command signal ③' during the field period F15, as represented by a NO answer at step ST-25, then the routine returns to step ST-2. On the other hand, if it is determined that the microcomputer 4 is receiving the second control command signal ③' during the field period F15, as represented by a YES answer at step ST-25, then the routine proceeds to step ST-26. In step ST-26, the lens device microcomputer 4 transmits, as the status signal LTC, the second controlled status signal (FIG. 16) with a unit number 0 (AF) and a unit number 2 (ZOOM) (FIG. 19B) to the camera body microcomputer 3 during the field period F16, as indicated at ④' on FIG. 18D. Then, the routine proceeds to the next decision step ST-27 in which it is determined by the judging means of the camera body microcomputer 3 whether or not the microcomputer 3 is receiving the second controlled status signal ④' during the field period F16. If it is determined that the microcomputer 3 is not receiving the second controlled status signal ④' during the field period F16, as represented by a NO answer at step ST-27, then the routine returns to step ST-2. On the other hand, if it is determined that the microcomputer 3 is receiving the second controlled status signal ④' during the field period F16, as represented by a YES answer at step ST-27, then the routine returns to step ST-20, and the above-described control communication sequence comprised of steps ST-20 to ST-27 is repeated in respect to the control command signal ⑤' and the controlled status signal ⑥' in the field periods F16 and F17, the control command signal ⑦' and the controlled status signal ⑧' in field periods F17 and F18, and the control command signal ⑨' and the controlled status signal ⑩' in field periods F18 and F19 (FIGS. 18C, 18D, 19A and 19B).

It will be seen from the above that, in accordance with the present invention, it is possible to obtain a video camera with exchangeable lens devices in which, regardless of the optical characteristics of the lens device selected for mounting on the camera body, the camera body can properly and positively control the selected lens device so that, when the cameraman takes a picture, desired conditions can be satisfied.

Further, as a result of the present invention, it is possible to obtain a video camera with exchangeable lens devices in which regardless of the kind of lens device selected for mounting on the camera body, such lens device is positively and properly controlled so that, when the cameraman takes a picture, desired conditions are satisfied, and the imager generates a video signal of the best quality for one or more fields in accordance with the optical characteristics of the selected lens device.

Moreover, in accordance with the present invention, it is possible to obtain a video camera with exchangeable lens devices in which the existence of suitable electrical connections between the camera body and a lens device selected for mounting thereon can be detected with ease.

Having described preferred embodiments of the invention in detail with reference to the accompanying drawings, it is to be understood that the present invention is not limited to those precise embodiments and that many changes and modifications may be effected therein by one skilled in the art without departing from the spirit and scope of the invention as defined in the appended claims.

What is claimed is:

1. A video camera with exchangeable lens devices comprising:
    a camera body having an image means for providing a video signal in response to the projection of a light image thereon:
    an exchangeable lens device removably mounted on said camera body for projecting said light image on said imager means;
    first microcomputer means included in said camera body;
    second microcomputer means included in said lens device;
    means for establishing communication between said first and second microcomputer means upon the mounting of said lens device on said camera body;
    means in said first microcomputer means for transmitting a control signal to said second microcomputer means of said lens device;
    means in said second microcomputer means for transmitting a respective optical characteristic data signal to said first microcomputer means; and
    means in said second microcomputer means for transmitting a controlled status signal to said first microcomputer means;
    said first and second microcomputer means being programmed so that, in an initial communication sequence therebetween after said lens device is mounted on said camera body, said first microcomputer means transmits a data transmission request signal to said second microcomputer means, and said second microcomputer means transmits said respective optical characteristic data signal to said first microcomputer means of said camera body when supplied with said data transmission request signal; and further so that, in a control communication sequence which follows said initial communication sequence, said second microcomputer means transmits said controlled status signal to said first microcomputer means and said first microcomputer means transmits said control signal to said second microcomputer means on the basis of said optical characteristic data signal and said controlled status signal supplied to said first microcomputer means from said second microcomputer means.

2. A video camera with exchangeable lens devices according to claim 1; further comprising means for applying a vertical synchronizing signal to said first computer means; and
    wherein said first and second microcomputer means of said camera body and said lens device generate said data transmission request signal, said control signal, said optical characteristic data signal and said controlled status signal in synchronism with said vertical synchronizing signal which is also used for the video signal derived from said imager means.

3. A video camera with exchangeable lens devices according to claim 1; further comprising
    means in said first microcomputer means for transmitting a connection confirming data transmission request signal to said second microcomputer means;
    means in said second microcomputer means for transmitting a connection confirming signal to said first microcomputer means upon receipt of said connection confirming data transmission request signal; and
    means in said first microcomputer means for detecting whether or not said connection confirming signal from said second microcomputer means of said lens device is received by said first microcomputer means of said camera body.

4. A video camera with exchangeable lens devices according to claim 1; wherein said camera body has receiving and transmitting terminals, a power supply source for said first microcomputer means thereof, and a power source voltage output terminal; and said lens device has receiving and transmitting terminals and a power source voltage input terminal for said second microcomputer means thereof; and further comprising
    means for electrically connecting said transmitting terminal of said camera body with said receiving terminal of said lens device, said receiving terminal of said camera body with said transmitting terminal of said lens device, and said power source voltage output terminal of said camera body with said power source voltage input terminal of said lens device upon the mounting of said lens device on said camera body; and
    current detecting means included in said camera body for detecting whether or not a power source current is flowing between said power supply source and said power source voltage output terminal.

* * * * *